March 17, 1964 T. KOKEISL 3,125,256
APPARATUS FOR STORING AND DELIVERING MEASURED QUANTITIES
OF GRANULAR OR LIKE FLOWABLE COMMINUTED MATERIALS
Filed Nov. 21, 1960
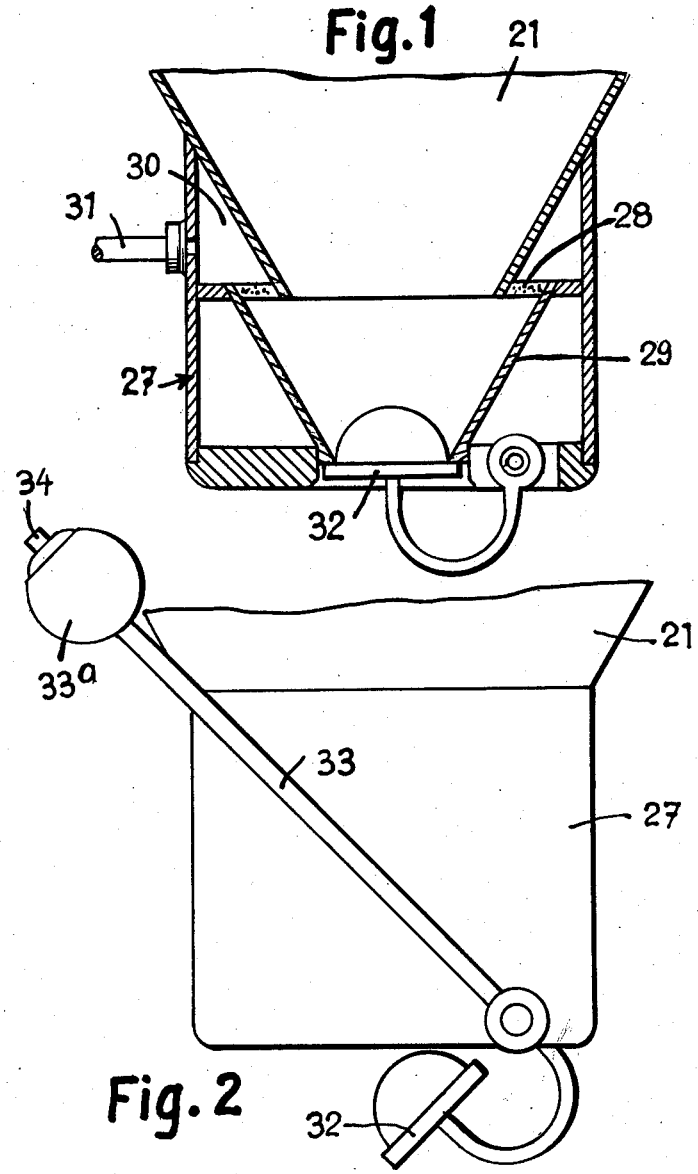
THEODOR KOKEISL
INVENTOR.
BY
AGENT

United States Patent Office 3,125,256
Patented Mar. 17, 1964

3,125,256
APPARATUS FOR STORING AND DELIVERING MEASURED QUANTITIES OF GRANULAR OR LIKE FLOWABLE COMMINUTED MATERIALS
Theodor Kokeisl, Zurlindenstrasse 21, Aarau, Switzerland
Filed Nov. 21, 1960, Ser. No. 70,748
Claims priority, application Austria Nov. 20, 1959
3 Claims. (Cl. 222—195)

This invention relates to an apparatus with at least one container for storing and delivering measured quantities of granular or like flowable bulk materials and, more particularly, foods in powder form, such as flour, caster sugar, etc., the container having a funnel-shaped bottom part with a discharge device, a locking member and a porous filter element for introducing a gaseous medium into the container for loosening the granular material and preventing arch formations therein.

In embodiments of the type known heretofore, the inner wall of the funnel-shaped bottom part of the container is lined with porous filter elements which are at a distance from the inner wall to form an interspace, through which compressed air is supplied; this air penetrates through the porous elements into the granular material to loosen the same. Now such a construction is particularly disadvantageous because the granular material must flow out along the porous elements and its movement is hindered by the comparatively high coefficient of friction of the surface of these filter elements. In order that the material can move over the filter elements with as little frictional engagement as possible, the gaseous medium must be blown in at a correspondingly high pressure which, however, results in a relatively large part of the air escaping through the funnel throat with formation of eddy currents, whereby not inconsiderable quantities of the material are carried along, thereby leading not only to loss of material but also to the formation of dust and contamination of the environment. The amount of material blown out of the container in this manner reaches unacceptable proportions if the filter elements, as is usually the case in prior art embodiments, extend into the range of the funnel throat. Said shortcomings are naturally not only encountered in embodiments in which the air is blown in through filter elements carrying the granular material, but in all constructions, in which the inlets of the air supply open into the slide way of the material, whereby the associated air slots and air holes as such offer a high resistance to the flow of the material so that a particularly high air pressure is necessary.

The primary object of the invention is to obviate the drawbacks mentioned and to create the possibility of taking from the container or its funnel-shaped bottom part any desired quantity of material, down to the very smallest measure, without any appreciable amount of dust being formed thereby. According to the invention this is achieved in that the funnel-shaped bottom part of the container has a cross-sectional enlargement in at least one location between the inlet and outlet of the funnel, and that the porous filter element for the inflow of the gaseous medium is arranged outside the slide way of the granular material. The porous filter disk can thus have no influence upon the flow of the granular material. Since, moreover, the filter element, lying outside the slide way of the granular material, is preferably disposed in the range of the cross-sectional enlargement situated between the inlet and outlet of the funnel, hence at a point located some distance from the outlet of the funnel, the air cannot escape directly through the funnel outlet and thereby blow out any part of the material. The air flowing out through the porous filter element, thereby not only penetrates into the material to loosen the same, but, moreover, pushes the goods and acts in aiding relationship with, the action of gravity to force the bulk material through the funnel part beneath the filter element towards the throat of the funnel, so that minimum pressure is required to ensure proper outflow of the material. Preferably the funnel-shaped bottom part, at the location of said cross-sectional enlargement, may exhibit an annular gap having the filter element set therein and coextensive therewith, the gap communicating with an annular distribution chamber for the gaseous medium, which chamber, at the location of said enlargement, surrounds the funnel-shaped part of the container.

The accompanying drawing shows, by way of example, one embodiment of the invention; in the drawing.

FIG. 1 is a vertical cross-sectional view of the funnel-shaped bottom part of the container of the apparatus, with the outlet closed, and FIG. 2 is an elevational view of the apparatus with the funnel outlet open.

Referring to the drawing, the funnel-shaped bottom part 21, 29 of the surmounted storage container (not shown) has, at a location between the inlet and outlet of the funnel, a cross-sectional enlargement receiving porous filter body 28 for the inflow of the gaseous medium; this body being located out of the slide way of the granular material, so that the same, upon discharging of the container, does not pass over the filter element 28. The arrangement according to the invention is such that the funnel-shaped bottom part, at the location of the cross-sectional enlargement, has an annular gap filled with the filter element 28, which communicates with an annular distribution chamber 30 for the gaseous medium, said chamber at said enlargement extending round the funnel-shaped bottom part or feed means of the container. The chamber 30 may be connected through a pipe 31 to an air compressor (not shown) that supplies conditioned compressed air to the apparatus. The outlet of the funnel-shaped chute means 21, 29 is closable by a locking member designed as a swivably mounted plug 32 which, by means of a lever 33, can be pivoted into either the closed or open position. The lever 33 at one end is provided with a spherical headpiece 33a having mounted therein a push-button switch 34 adapted to close a circuit to start the driving motor of the air compressor. Thereby the funnel-shaped bottom part is surrounded by a casing 27, whose top part laterally defines the annular distribution chamber 30, and whose lower part has the lever 33 pivoted thereon.

If it is required to take material from the container, the lever 33 is swung in a sense opening the outlet of the funnel-shaped bottom part 21, 29, after the push-button 34 has previously been pressed down to switch on the air compressor motor. The compressed gaseous medium is pressed through the filter element 28, whereby the material will be loosened and, at the same time, be pushed towards the outlet of the bottom part; it does not slide over the filter element which, as being porous, has a correspondingly rough surface, but over the smooth wall of the funnel part 29, whereby a relatively low pressure ensures continuous emptying without the formation of any appreciable amount of dust.

What I claim is:
1. A dispenser for flowable comminuted material, comprising upwardly widening chute means formed with an inlet opening at the upper end thereof and an outlet opening at the lower end thereof, closure means at said lower end for releasably blocking said outlet opening, feed means at said upper end for introducing said material into said chute means through said inlet opening, said feed means extending with clearance into said inlet opening, and a porous body substantially coextensive with the space between said feed means and said chute means and in line with an external source of fluid under pressure for admitting fluid from said source into said chute means over substantially the entire area of said space.

2. A dispenser for flowable comminuted material, comprising upwardly widening generally conical chute means formed with an inlet opening at the upper end thereof and an outlet opening at the lower end thereof, closure means at said lower end for releasably blocking said outlet opening, feed means at said upper end for introducing said material into said chute means through said inlet opening, said feed means extending with annular clearance into said inlet opening, and an annular porous body substantially coextensive with the space between said feed means and said chute means and in line with an external source of fluid under pressure for admitting fluid from said source into said chute means over substantially the entire area of said space.

3. A dispenser for flowable comminuted material, comprising upwardly widening chute means formed with an inlet opening at the upper end thereof and an outlet opening at the lower end thereof, closure means at said lower end for releasably blocking said outlet opening, feed means at said upper end for introducing said material into said chute means through said inlet opening, said feed means extending with annular clearance into said chute means, housing means forming an annular chamber outwardly of said feed means and communicating with said inlet opening, a source of fluid under pressure connected to said chamber, and a porous body at said inlet opening bridging the space between said chamber and the interior of said chute means for admitting said fluid from said chamber into said chute means, said feed means including a storage hopper having a downwardly converging conical discharge portion terminating with annular clearance at said inlet opening, said porous body being substantially coextensive with said clearance for admitting said fluid into said chute means over substantially the entire area of said space.

References Cited in the file of this patent

UNITED STATES PATENTS

| | | |
|---|---|---|
| 1,558,403 | Shacikoski | Oct. 20, 1925 |
| 2,176,902 | Horrocks | Oct. 24, 1939 |
| 2,270,443 | Jares | Jan. 20, 1942 |
| 2,305,196 | Schlabaugh et al. | Dec. 15, 1942 |
| 2,538,441 | Carter | Jan. 16, 1951 |
| 2,723,054 | Louden et al. | Nov. 8, 1955 |
| 2,987,221 | Milton | June 6, 1961 |